(12) United States Patent
Chouly

(10) Patent No.: US 6,810,089 B2
(45) Date of Patent: Oct. 26, 2004

(54) BLOCK DETECTION METHOD FOR A CHANNEL SUBJECTED TO FADING

(75) Inventor: Antoine Chouly, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 682 days.

(21) Appl. No.: 09/730,675

(22) Filed: Dec. 6, 2000

(65) Prior Publication Data

US 2001/0007579 A1 Jul. 12, 2001

(30) Foreign Application Priority Data

Dec. 7, 1999 (FR) .......................................... 99 15416

(51) Int. Cl.[7] .............................................. H04B 15/00
(52) U.S. Cl. ........................ 375/285; 375/284; 375/278; 375/296
(58) Field of Search ................................. 375/232, 233, 375/342, 285, 346, 254, 278, 299, 296, 284, 147; 370/441, 335, 485, 342

(56) References Cited

U.S. PATENT DOCUMENTS

| | | | | |
|---|---|---|---|---|
| 5,311,549 A | * | 5/1994 | Mahieux | 375/342 |
| 5,418,817 A | * | 5/1995 | Richter | 375/232 |
| 5,436,929 A | * | 7/1995 | Kawas Kaleh | 375/233 |
| 5,790,598 A | * | 8/1998 | Moreland et al. | 375/233 |
| 5,970,060 A | * | 10/1999 | Baier et al. | 370/342 |
| 6,151,358 A | * | 11/2000 | Lee et al. | 375/232 |

* cited by examiner

Primary Examiner—Stephen Chin
Assistant Examiner—Ted Wang
(74) Attorney, Agent, or Firm—Dicran Halajian

(57) ABSTRACT

A transmission system having a channel subjected to fading uses an iterative block detection method which includes a multiplication step for multiplying the received blocks via a filter matrix whose elements are written as $$\frac{\rho_j^*}{E(\rho_j^2) + N_0}$$

where $\rho_j^*$, $j=1, \ldots, n$ are the conjugate values of the coefficients $\rho_j$ of the channel, n is the size of the block, $E(\rho_j^2)$ is the expectation $\rho_j^2$, and $N_o$ is the variance of the Gaussian noise. Further, after phase compensation, an improved filter matrix is used whose elements are written as $$\frac{\rho_j^{p(i)}}{E(\rho_j^{p(i)+1})}$$

where p(i) is a real magnitude as a function of the iteration i. Illustratively, the powers p(i) are chosen by applying a criterion of bit error rate minimization.

10 Claims, 3 Drawing Sheets

BLOCK DETECTION METHOD FOR A CHANNEL SUBJECTED TO FADING

The invention relates to a transmission system comprising at least a transmitter and a receiver for transmitting data formatted in blocks over a transmission channel which introduces a distortion which is defined on the basis of multiplicative coefficients, said receiver comprising block detection means for detecting blocks by successive iterations, said block detection means themselves comprising block multiplier means for multiplying blocks via a filter matrix intended to compensate for said distortion.

The invention also relates to a receiver intended to be used in such a system, a block detection method intended to be used in such a receiver and a computer program for implementing such a method.

The invention finds important applications in the field of transmissions by a channel subjected to fading, for example, a Rayleigh channel or a Rice channel. This is the case, for example, with mobile radio systems and mobile satellite transmission systems.

A transmission system of this type is notably described in the article "Transformation of a Rayleigh fading channel into a set of parallel AWGN channels and its advantages for coded transmission" by M Reinhardt and J. Lindner, published in Electronics Letters vol. 31, no. 25, Dec. 7, 1995.

In the system described in this article, the received blocks are multiplied via a filter matrix whose elements are written as $$\frac{\rho_j^*}{E(\rho_j^2) + N_0}$$

where $\rho_j^*$, $j=1, \ldots, M$ are the conjugates of the coefficients $\rho_j$ of the channel, M is the size of the block, $E(\rho_j^2)$ is the likelihood of $\rho_j^2$ and $N_o$ is the variance of the Gaussian noise.

In practice, this system has good performance for QPSK modulations. But the performance is insufficient for the QAM modulations and for PSK modulations which have a large number of points.

It is an object of the invention to propose a transmission system of the type defined above having better performance.

This object is achieved with a system as described in the opening paragraph and characterized in that the elements of the filter matrix are formed from a module power of said coefficients, the value of said power being a function of the iteration.

The values of said powers are chosen, for example, by applying an error minimization criterion.

In a first embodiment the number of iterations is fixed. In a second embodiment the detector or block detection means comprises means for determining the convergence of the decisions which are obtained at successive iterations, and means for terminating the detection when the convergence is determined. This second embodiment permits on average to limit the number of iterations necessary to come close to the performance obtained with a Gaussian channel (that is to say, a channel that is not subjected to fading).

These and other aspects of the invention are apparent from and will be elucidated, by way of non-limitative example, with reference to the embodiment(s) described hereinafter.

Figure 1:
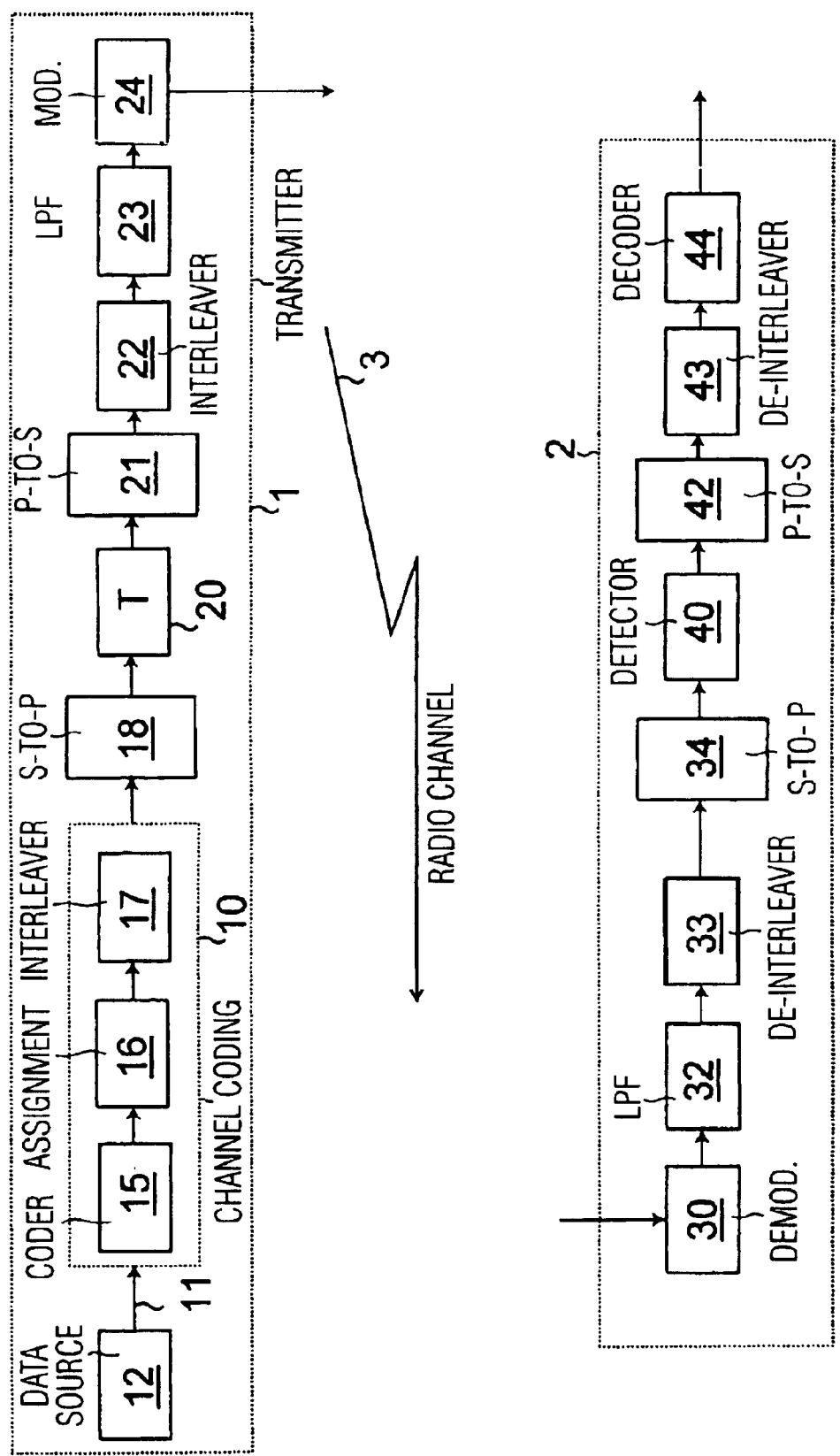
FIG. 1 represents an example of a system according to the invention.

In FIG. 1 is shown an example of a transmission system according to the invention. This system comprises a transmitter 1 for transmitting data to a receiver 2 via a radio channel 3, which is subjected to fading.

The transmitter 1 comprises channel coding means 10 for coding a binary stream 11 produced by a data source 12. The channel coding means 10 comprise a coder 15 which introduces redundancy of the data 12, an assignment device 16 which assigns a symbol chosen in a constellation to a group of bits, and an interleaver 17 which permits to avoid the presence of error packets at the decoding. The symbols produced by the interleaver 17 are applied to a serial-to-parallel converter 18 which combines the symbols to blocks X of length M. These blocks are transmitted to orthogonal transforming means 20. The orthogonal transforming means 20 transform the blocks X into blocks Y by multiplying the vector $X=[X_1, X_2, \ldots, X_M]^t$ (where t indicates the transpose) via an orthogonal matrix T. The output vectors Y are thus written as Y=TX. By way of example a discrete Fourier transform is used or a Hadamard transform. The output vectors Y are then transmitted to a parallel-to-serial converter 21. The obtained symbol stream is interleaved by an interleaver 22 so as to guarantee that the attenuation factors, which will be introduced in the symbols by the channel, are independent of each other. The symbols delivered by the interleaver 22 are filtered by a low-pass filter 23 and then modulated by a modulator 24. The radio signal obtained is transmitted by the radio channel 3 which is subjected to fading.

The receiver 2 comprises demodulation means 30 for demodulating a received radio signal. These demodulation means 30 also include phase estimation and phase compensation means, so that there is not phase difference between the transmitted symbols and the symbols obtained at the output of the demodulation means.

The symbols obtained at the output of the demodulation means are filtered by a low-pass filter 32, then transmitted to a de-interleaver 33. The de-interleaved symbols are transmitted to a serial-to-parallel converter 34 which delivers blocks Z of length M. These blocks Z are transmitted to an iterative block detector or block detection means 40. At the end of the last iteration (i=L), the detector 40 delivers blocks $\tilde{X}(L)$. These blocks $\tilde{X}(L)$ are transmitted to a parallel-to-serial converter 42. The obtained symbol stream is transmitted to a de-interleaver 43, then to a decoder 44. After decoding, the decoder 44 makes the final decisions on the received symbols.

The transmission channel multiplies each transmitted signal by a coefficient and adds a Gaussian noise. For a transmitted block Y, the channel is thus featured by a diagonal matrix $D\rho=\text{diag}(\rho_1, \ldots, \rho_M)$, and a noise vector N. The block Z received on the input of the detector 40 is thus written as $Z=D\rho Y+N$. Thanks to the interleaving 22 performed before the transmission, the coefficients $\rho_j$ are independent variables. They are, for example, distributed according to a Rayleigh law or Rice law. When there is no phase difference between the transmitted symbols and the symbols applied to the input of the detector 40, the coefficients $\rho_j$ are real numbers.

Figure 2:
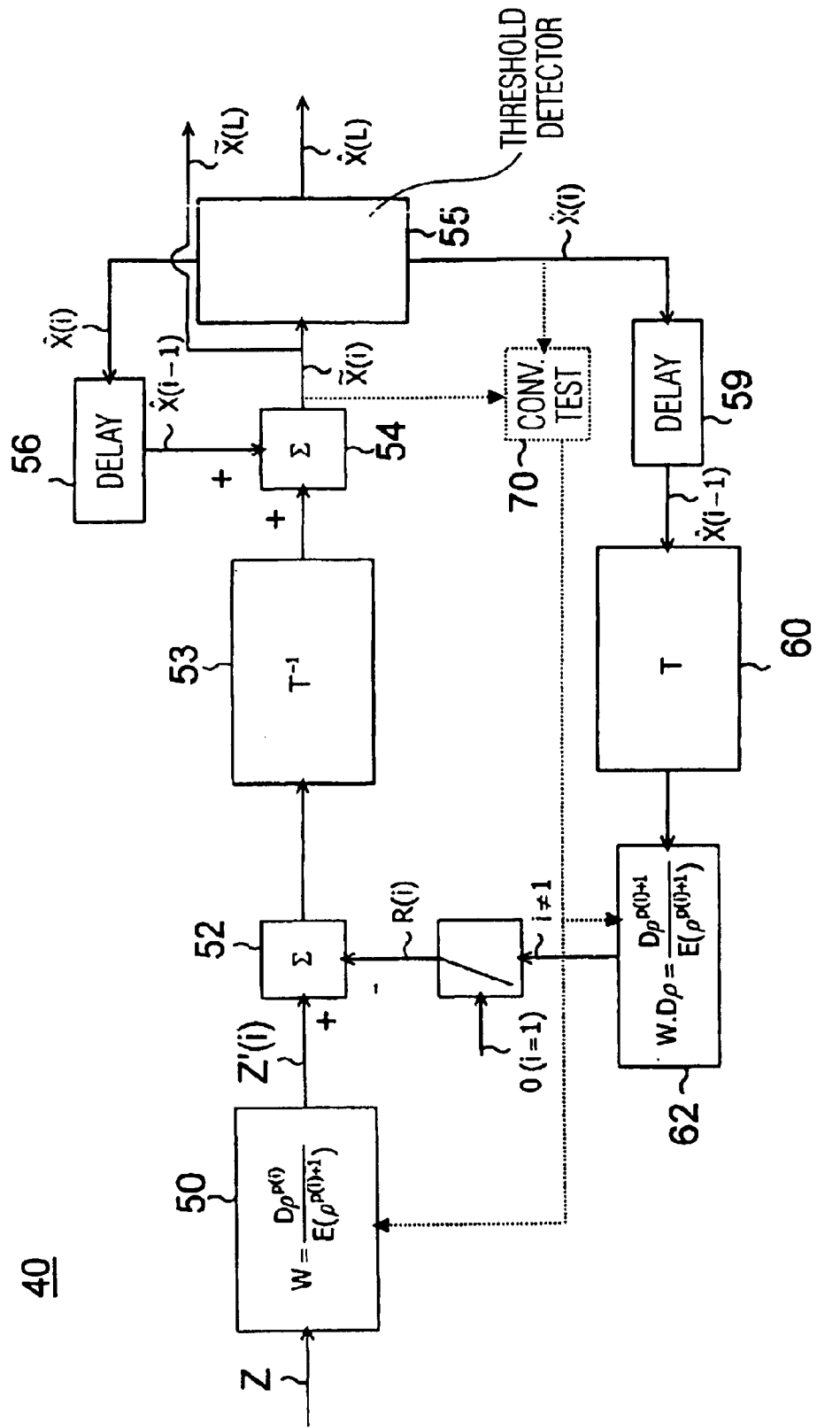
FIG. 2 represents a detailed example of a receiver according to the invention.

In FIG. 2 is explained the operation of the detector 40 in that a block representation is used. The detector 40 has an iterative operation. In the following of the description the index i (i=1, \ldots, L) is an iteration counter. The detector 40 comprises filter means 50, which multiply the received blocks Z with a filter matrix $$W(i) = \frac{D\rho^{p(i)}}{E(\rho^{p(i)+1})}$$

where $D\rho^{p(i)} = \mathrm{diag}(\rho_1^{p(i)}, \ldots, \rho_M^{p(i)})$, $E(\rho^{p(i)+1})$ is the mathematical expectation of $\rho^{p(i)+1}$, and p(i) is a real number. The elements of the filter matrix W(i) and the block $$Z'(i) = \frac{D\rho^{p(i)}}{E(\rho^{p(i)+1})} Z$$

delivered by the filter means 50 depend on the iteration i. The output of the filter means 50 is applied to the input of a loop formed by a forward and backward path. On its forward path the loop comprises a subtracter element 52 whose output is connected to inverse transforming means 53. The output of these inverse transforming means 53 is applied to a first input of a summation element 54. The summation element 54 has a second input on which a decision $\hat{X}(i-1)$ made at the iteration (i−1) (with $\hat{X}(0) = [0, \ldots 0]^t$) is carried. The summation element 54 processes a new block $\tilde{X}(i)$. Based on this new block and as long as i<L, a threshold detector 55 makes a decision $\hat{X}(i)$ for the iteration i. At the last iteration (i=L), the new block $\tilde{X}(L)$ is transmitted to the parallel-to-serial converter 42. The final decision about each received symbol is made by the decoder 44 at the end of the decoding.

The downward path comprises transforming means 60 for applying the transformation defined by the orthogonal matrix T to the decision $\hat{X}(i-1)$ which has been made at the iteration i−1. Multiplier means 62 then multiply the transformed block $T\hat{X}(i-1)$ by the product of the diagonal matrix $D\rho$ and the filter matrix W(i). The multiplier means 62 thus deliver a block $$R(i) = \frac{[D\rho^{p(i)+1}]T\hat{X}(i-1)}{E(\rho^{p(i)+1})}.$$

Finally, the subtracter element 52 subtracts the block R(i) from the block Z'(i) (with $R(1) = [0, \ldots, 0]^t$, noted in FIG. 2 as 0(i=1)).

Thus the new block $\tilde{X}(i)$ is written as:

$$\tilde{X}(i) = \hat{X}(i-1) + T^{-1}Z'(i) - T^{-1}\left\{\frac{[D\rho^{p(i)+1}]T\hat{X}(i-1)}{E(\rho^{p(i)+1})}\right\} + N',$$

where N' is a Gaussian noise. The term $$T^{-1}Z'(i) - T^{-1}\left\{\frac{[D\rho^{p(i)+1}]T\hat{X}(i-1)}{E(\rho^{p(i)+1})}\right\}$$

forms a difference between the effectively received block after the filtering and the block which would have been received after the same filtering for the decision made at the previous iteration. This difference is called intersymbol interference. It diminishes with each iteration.

The blocks 56 and 59 in FIG. 2 represent delay elements capable of delivering at the iteration i the decisions $\hat{X}(i-1)$ made at the previous iteration.

The elements of the filter matrix W(i) are proportional to a power p(i) of the channel coefficients. In the example described here the channel coefficients are real because the phase of the received symbols has been compensated at the demodulation. When the phase has not been compensated beforehand, the channel coefficients are complex numbers and the elements of the filter matrix W(i) are proportional to a power p(i) of the module of said coefficients.

The use of a power $p(i) \ne 1$ permits to reduce the intersymbol interference much more rapidly. But this is at the cost of an amplification of Gaussian noise because, due to the filtering operation, the variance of N' is then higher than that of N.

The powers p(i) depend on the constellation used and on the signal-to-noise ratio. They are chosen, for example, via simulations while supposing that the transmitted symbols are known and, while applying a bit error rate minimization criterion, or the variance criterion of the difference between the input of the threshold detector $\tilde{X}(i)$ and the transmitted block.

In a particularly advantageous manner, the value of p(L) is chosen to be equal to 1 and the values of the powers p(i) for i<L are chosen to be equal to a constant value $\mu$. This constant value $\mu$ is, for example, equal to the average of the powers p'(i) obtained for each iteration i=1, ..., L−1 by applying one of the error minimization criterions already discussed. The powers p'(i) are determined, for example, in the following fashion:

a first series of simulations is made with a single iteration for determining the power p'(1) that minimizes the bit error rate obtained at the end of this iteration, or that minimizes the variance of the difference between the input of the threshold detector $\tilde{X}(1)$ and the transmitted block, a second series of simulations is made with two iterations by using the fixed power p'(1) during the first series of simulations, for determining the power p'(2) that minimizes the error rate obtained at the end of the second iteration, or that minimizes the variance of the difference between the input of the threshold detector $\tilde{X}(2)$ and the transmitted block, and so on and so forth up to the $(L-1)^{th}$ iteration.

It is particularly interesting to choose a constant power for the iterations 1 to L−1, because in that case the matrix W(i) is constant for the iterations 1 to L−1. The filter operation, which permits to obtain Z'(i), is thus only performed a single time for these iterations, which considerably reduces the complexity of the calculations.

Furthermore, it is particularly interesting to choose a power equal to 1 for the last iteration, because in that case the variance of the Gaussian noise is the same, before and after the filtering, which means that at the last iteration the filtering does not bring about any amplification of the noise. This solution is optimal because one thus obtains an acceleration of the reduction of the intersymbol interference by using powers $p(i) \ne 1$ at the $L-1^{th}$ first iterations and because the secondary effect of amplifying the Gaussian noise is eliminated by using p(i)=1 for the last iteration.

In a particularly advantageous embodiment the loop of the detector 40 comprises on its return path a convergence test element 70. The function of this test element is to determine the convergence of the decisions obtained at successive iterations so as to terminate the detection when the convergence is reached (that is to say, the intersymbol interference is close to zero). In a first embodiment the test element 70 compares the decisions $\hat{X}(i-1)$ and $\hat{X}(i)$ made for two successive iterations. When these decisions are identical, a last iteration is made with p(i+1)=1. In a second embodiment represented in a dotted line in FIG. 2, the test element calculates the mean square error between the decision with threshold X̂(i) and the block X̃(i) based on which this decision has been made, and compares the mean square errors calculated of the M symbols of the block for two successive decisions X̂(i−1) and X̂(i). When the difference between these two mean square errors is lower than a certain threshold, a last iteration is made with p(i+1)=1.

It will be noted that the elements of the filter matrix, which is used in the invention, are independent of the variance $N_o$ of the Gaussian noise. The variance $N_o$ of the Gaussian noise need not be estimated here. This is an additional advantage compared to the cited prior art, because this diminishes the calculation complexity and augments the precision of the result.

In the embodiment which has been described by way of example, the transmitter comprises channel coding means 10 and the receiver comprises decoding means which use the block X̃(L). This is not limitative. In certain cases the channel decoding means use the decision X̂(L) in lieu of the block X̃(L). In addition, the channel coding means are optional and when the transmitter does not comprise channel coding means, the final decision on the received symbols is made by the threshold detector 55. In that case, it is the decision X̂(L) that is transmitted to the parallel-to-serial converter 42.

In the embodiment which has been described by way of example, the product of the diagonal matrix Dρ and of the filter matrix W(i) is normalized. This is an advantageous choice to implement, which permits to obtain a single detector that can be used well both with a constant envelope constellation and with a non-constant envelope constellation. In other embodiments could be used a non-normalized product, that is to say, a filter matrix W(i) could be had that presents a proportionality factor with the powers of the coefficients of the channel that is different from the channel that has been used here.

In the embodiment which has been described by way of example, a single detector is used which processes complex symbols. However, if a square constellation and a real transform constellation is used (which is the case with the Hadamard transform), one may also use two detectors in parallel for respectively processing the real portions and the imaginary portions of the complex symbols.

Figure 3:
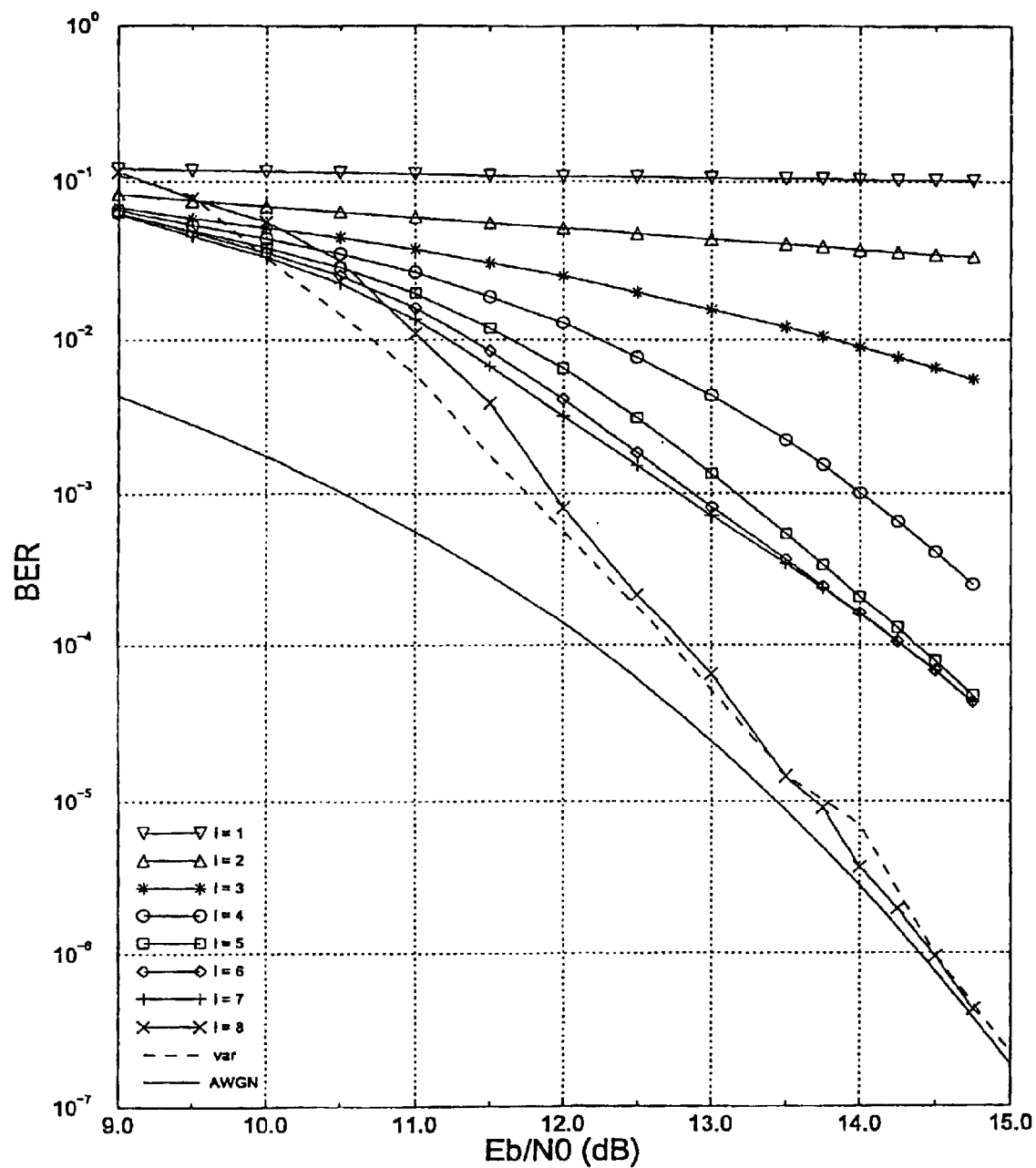
FIG. 3 shows the results obtained with the invention in the case of a non-coded 16-QAM modulation and a $12^{th}$ order Hadamard transform.

In FIG. 3 are represented results obtained with the invention for a non-coded 16-QAM modulation and a 12th order Hadamard transform (M=4096). The curves i=1 to i=8 represent the bit error rate as a function of the signal-to-noise ratio for the respective iterations 1 to 8, with p(i)=−0.28 for i=1 to 7 and p(8)=1. The curve obtained at the 8th iteration is close to the result obtained with a Gaussian channel (AWGN curve) for signal-to-noise ratios higher than 13.5 dB.

The curve VAR represents the results obtained when a variable number of iterations is used, limited to a maximum value of 20 for reasons of complexity. For the low signal-to-noise ratios, the number of iterations made is equal to 20. It diminishes when the signal-to-noise ratio augments. For low signal-to-noise ratios, the results obtained are better than when a fixed number of 8 iterations is used. The curves i=8 and VAR converge meet from 13 dB onwards. The number of iterations to be made diminishes from 14.5 dB onwards (it is equal to 7 when Eb/No=14.5 dB, and to 6.5 when Eb/No=15 dB). This embodiment thus permits to reduce the complexity of the detection when the signal-to-noise ratio is high.

What is claimed is:

1. A transmission system comprising at least a transmitter and a receiver for transmitting data formatted in blocks over a transmission channel which introduces a distortion which is defined on the basis of multiplicative coefficients, said receiver comprising block detection means for detecting blocks by successive iterations, said block detection means themselves comprising block multiplier means for multiplying blocks via a filter matrix intended to compensate for said distortion, wherein the elements of the filter matrix are formed on the basis of a power of the module of said coefficients, the value of said power being a function of the iteration.

2. A transmission system as claimed in claim 1, wherein the values of said powers are chosen by applying an error minimization criterion.

3. A transmission system as claimed in claim 1, wherein said detector comprises means for determining the convergence of the decisions obtained at the successive iterations, and means for terminating said detection when the convergence is determined.

4. A transmission system as claimed in claim 1, wherein said detection means further include:

means for making a first decision on a received block, means for determining for a current iteration a difference between the actually received block after filtering and a block that would have been received after the same filtering for the decision made at the preceding iteration, means for forming a new block by adding said difference to the decision made at the preceding iteration, means for making a decision for the current iteration based on said new block.

5. A receiver intended to be used in a transmission system as claimed in claim 1.

6. A block detection method intended to be used in a receiver of a transmission system for transmitting block-formatted data over a transmission channel which introduces a distortion which is defined on the basis of multiplicative coefficients, said method comprising at least a block multiplying step of multiplying blocks via a filter matrix intended to compensate for said distortion, wherein the elements of the filter matrix are formed on the basis of a power of the module of said coefficients, the value of said power being a function of the iteration.

7. A detection method as claimed in claim 6, wherein the values of said powers are chosen by applying an error minimization criterion.

8. A detection method as claimed in claim 6, further comprising determining the convergence of the decisions obtained at successive iterations, and terminating said detection when the convergence is determined.

9. A detection method as claimed in claim 6, further comprising:

making a first decision on a received block, determining for a current iteration a difference between the actually received block after filtering and the block that would have been received after the same filtering, for the decision made at the preceding iteration, forming a new block by adding said difference to the decision made at the preceding iteration, making a decision for said current iteration, based on said new block.

10. A computer program comprising means for implementing a method as claimed in claim 6.

* * * * *